United States Patent [19]
Höhn

[11] Patent Number: 5,204,599
[45] Date of Patent: Apr. 20, 1993

[54] CONTOUR COMPENSATION METHOD FOR NUMERICALLY CONTROLLED MACHINES

[75] Inventor: Georg Höhn, Forchheim, Fed. Rep. of Germany

[73] Assignee: Siemens Aktiengesellschaft, Munich, Fed. Rep. of Germany

[21] Appl. No.: 822,708

[22] Filed: Jan. 21, 1992

[30] Foreign Application Priority Data

Jan. 18, 1991 [EP] European Pat. Off. ........ 91100596.5

[51] Int. Cl.$^5$ ............................................ G05B 19/415
[52] U.S. Cl. .................................... 318/571; 318/573; 318/572; 364/474.29; 364/474.3
[58] Field of Search ................................ 318/570–579; 364/474.1–474.32

[56] References Cited

U.S. PATENT DOCUMENTS

| | | | |
|---|---|---|---|
| 3,679,955 | 7/1972 | Rhoades | 318/572 |
| 4,445,182 | 4/1984 | Morita et al. | 318/572 X |
| 4,503,493 | 3/1985 | Burkhardt et al. | 318/573 X |
| 4,575,791 | 3/1986 | Schwefel | 318/570 X |
| 4,648,024 | 3/1987 | Kato et al. | 318/570 X |
| 4,659,265 | 4/1987 | Kishi et al. | 318/572 X |
| 4,698,573 | 10/1987 | Niwa | 318/571 |
| 4,698,777 | 10/1987 | Toyoda et al. | 318/573 X |
| 4,700,314 | 10/1987 | Kinoshita | 364/475 |
| 4,703,415 | 10/1987 | Kishi et al. | 318/572 X |
| 4,713,517 | 12/1987 | Kinoshita | 318/570 X |
| 4,739,489 | 4/1988 | Kishi et al. | 318/571 X |
| 4,764,877 | 8/1988 | Tanaka et al. | 364/474 |
| 4,980,627 | 12/1990 | Joboji et al. | 318/570 |

FOREIGN PATENT DOCUMENTS

| | | |
|---|---|---|
| 0319587 | 6/1989 | European Pat. Off. |
| 3327760 | 2/1985 | Fed. Rep. of Germany |
| 2268297 | 11/1975 | France |
| 1501134 | 2/1978 | United Kingdom |

Primary Examiner—Paul Ip
Attorney, Agent, or Firm—Kenyon & Kenyon

[57] ABSTRACT

When the movement of a machine element is guided by a multi-axial, numerically controlled machine through the selection of interpolation points which are calculated and stored off-line, a tool-radius correction is rendered possible. This occurs because correction interpolation points are calculated on the basis of interpolation points and thus, with the least possible expenditure of time, a new trajectory curve can be generated, with which the radius changes are considered. In addition, a change in feedrate can be achieved through the selection of override values by placing fine interpolation points between two interpolation points at a time.

3 Claims, 1 Drawing Sheet

CONTOUR COMPENSATION METHOD FOR NUMERICALLY CONTROLLED MACHINES

RELATED APPLICATIONS

This application is related to "Open Loop Control for Guiding the Motion of a Numerically Controlled Machine Tool," filed on or about even date herewith by Georg Hoehn, which is hereby incorporated by reference.

BACKGROUND OF THE INVENTION

The present invention relates generally to numerically controlled machines, and more particularly to a contour compensation method for numerically controlled machines.

In the case of numerically controlled machines, for example numerical machine tools or robots, the trajectory curve on which a tool is guided is subdivided into path segments. This is accomplished by calculating interpolation points along the trajectory curve, which interpolation points are successively traversed by the machine tool's guide device. It is usually very time-consuming to calculate the interpolation points for a specified trajectory curve. Therefore, in many cases, this is carried out off-line before the first machining operation. The calculated interpolation points can then be stored and transmitted during the operation of the specific numerically controlled machine directly to its position control loop, whereupon a tool is guided along the trajectory curve specified by the interpolation points.

In the machining of tools, it can happen that a change in the tool geometry makes it necessary to alter the trajectory curve. Thus, for example, the radius of a milling tool can become smaller as the result of wear. Since, when circular tools are used, the tool center point is ordinarily guided along the specified trajectory curve, the clearance of the trajectory curve up to the workpiece contour has to be modified. However, it could also be necessary, for example, to replace a worn-out tool with a new one. In this case, the radius would become enlarged for a circular tool, so that the trajectory curve would have to have a greater clearance to the workpiece contour.

When interpolation points are recalculated at any time because of such changes in the tool geometry, given an unvarying workpiece contour, this leads to considerable machine down-time.

The present invention is directed to the problem of developing a method for achieving a simple path correction for numerically controlled machines, on-line so that machine down time due to recalculation of interpolation points can be eliminated.

SUMMARY OF THE INVENTION

The present invention solves this problem by a method by determining correction interpolation points by adding a correction vector to each existing interpolation point, when a change in the tool geometry makes it necessary to alter the specified distance of the trajectory curve from the contour. The method then generates a corrected trajectory curve by means of the correction interpolation points and guides the replacement tool along the corrected trajectory curve.

The process is applicable thereby both for planar as well as for three-dimensional trajectory curves. In the case of planar trajectory curves, the correction vector points in the direction of the bisector of the angle, which is formed by the path segments situated before and after the specific interpolation point. In the case of three-dimensional trajectory curves, the orientation of the tool must additionally be considered when the correction vector is determined. The computing capacity required to calculate the correction interpolation points for planar trajectory curves is nominal, so that this can also be accomplished during the operation of the numerically controlled machine, thus on-line. In the case of three-dimensional trajectory curves or in case of an insufficient on-line computing time, the direction of the correction vector is calculated in an off-line procedure, so that all that still has to be weighted in on-line operation is the absolute value of the correction vector. All that the user has to enter thereby is the change in the tool geometry—for a circular tool, this would mean a modification of the radius. In machines provided with appropriate measuring devices, the changes in the tool geometry can also be determined automatically and taken into consideration during the machining operation. Even when the correction interpolation points are calculated off-line, a considerable time savings is achieved compared to the time required for recalculating the interpolation points.

An advantageous variant of the present invention occurs when fine interpolation points are generated between two correction interpolation points as a function of a specifiable control parameter. Thus, the tool is guided from one correction interpolation point or fine interpolation point to the fine interpolation point or correction interpolation point that follows next. Since the travel time from one interpolation point or from one fine interpolation point to its respective next fine interpolation point or next correction interpolation point is definitely stipulated in each case by the interpolation clock cycle of the numerical control, the tool path feedrate can be modified in accordance with the control parameter by specifying fine interpolation points lying between the correction interpolation points.

An appropriate change in the feedrate is even able to be achieved when the fine interpolation points are already defined between two interpolation points and a correction interpolation point is then determined for every interpolation point or fine interpolation point. Which of the processes for changing feedrate is preferred thereby can depend on the set-up of the numerical control or of the corresponding control program.

DETAILED DESCRIPTION

Figure 1:
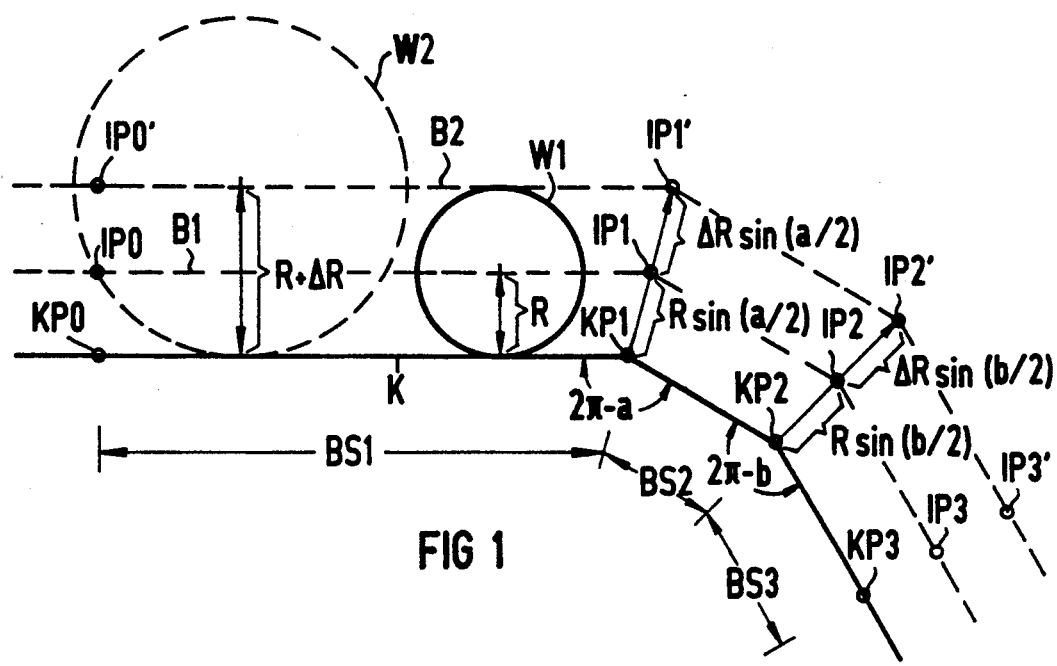
FIG. 1 depicts the guidance of two tools along two trajectory curves.

FIG. 1 shows a tool W1 with a radius R. The tool W1 is guided along a trajectory curve B1, drawn as a dotted line, to machine the workpiece contour K. The trajectory curve B1 is subdivided into individual path segments BS1, BS2, BS3, which are bounded by the interpolation points IP0 and IP1, IP1 and IP2, IP2 and IP3, respectively. The interpolation points IP0 through IP3 lie at the shortest distance to the contour K at the contour points KP0 through KP3. This means that in a straight contour section, there is a right angle between the connection of the interpolation point IP0 or IP3 and the contour point KP0 or KP3 and the contour. The connected section at the corner points of the contour lies between the contour point and the interpolation point—in the example, from the contour point KP1 to the interpolation point IP1, or from the contour point KP2 to the interpolation point IP2—in the direction of the bisector of the outer angle a or b formed by the corner contour. The section from the contour point KP1 to the interpolation point IP1, or from the contour point KP2 to the interpolation point IP2 thus amounts to $$\frac{R}{\sin\frac{a}{2}} \text{ or } \frac{R}{\sin\frac{b}{2}}. \quad \text{Equation (1)}$$

The tool W1 shall now be replaced by the tool W2 drawn in outline with a dotted line. In order for the tool W2 to also machine the same contour K that tool W1 machined previously, a new trajectory curve B2 must be produced for the tool W2. This can be done simply at the interpolation points IP0 and IP3 merely by adding the distance delta R to their respective coordinates. Delta R is the distance by which the new tool W2 deviates from the first tool W1. At the corner points of the tool contour K, thus at the contour points KP1 and KP2, a new correction interpolation point IP1', IP2' is calculated in each case for the former coordinates of the interpolation points IP1 or IP2. This new correction interpolation point IP1', IP2' is likewise situated in the direction of the bisector of the angle a or b between the travel sections bordering on the specific contour point KP1, KP2, and its distance to the interpolation point IP1 or IP2 equally amounts to $$\frac{\Delta R}{\sin\frac{a}{2}} \text{ or } \frac{\Delta R}{\sin\frac{b}{2}}. \quad \text{Equation (2)}$$

The center point of the tool W2 is then guided along the new trajectory curve B2 formed by the correction interpolation points IP0' through IP3'. As can be easily discerned in FIG. 1, the distances between two correction interpolation points IP0' through IP3' are slightly greater than the distances between the previous interpolation points IP0 through IP3 on the trajectory curve B1. This leads to a slight increase in the feedrate of the tool W2. This increase is hardly of any consequence, however, due to the fact that, as a rule, the variations in the radius of the different, or rather worn tools are slight.

It could also be the case, however, that two different machining operations are supposed to be carried out on the workpiece K, with two different-sized tools and with different feedrates. For example, a grinding operation could follow a milling operation, whereby a grinding tool W2 has a larger diameter than a milling tool W1. To achieve a good grinding quality, the grinding tool W2 will in fact exhibit a considerably higher rotational speed than the milling tool W1, however the tool path feedrate of the grinding tool W2 will have to be reduced considerably relative to the tool path feedrate of the milling tool W1. A possibility for modifying the tool path feedrate will be clarified in greater detail in the following on the basis of FIG. 2.

Figure 2:
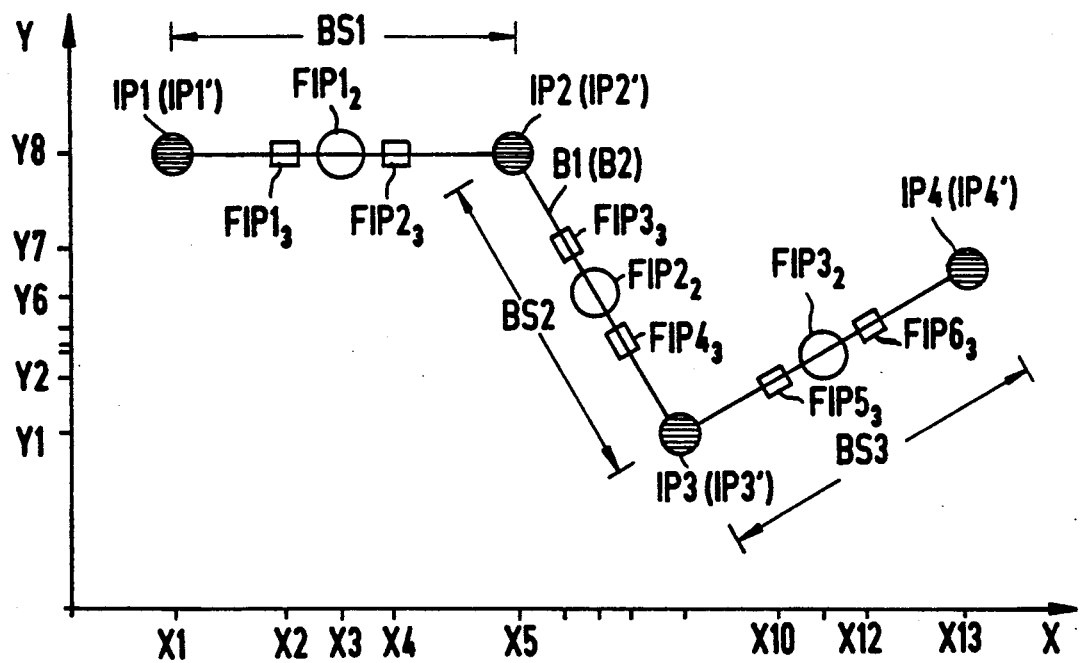
FIG. 2 depicts the generation of fine interpolation points for changing the feedrate.

FIG. 2 shows a trajectory curve with interpolation and fine interpolation points IP, FIP. As far as the trajectory curve is concerned, it can be a question of both a first trajectory curve B1 corresponding to FIG. 1, which is defined by the interpolation points IP1 through IP4, or of a trajectory curve B2 corresponding to FIG. 1, which is defined by the correction interpolation points IP1' through IP4'. The determination of the fine interpolation points FIP described in the following can be carried out namely both on the basis of the original trajectory curve B1 (FIG. 1) defined by the interpolation points IP1 through IP4, as well as on the basis of the trajectory curve B2 (FIG. 1) defined by the correction interpolation points IP0' through IP3'. In the first case, after the fine interpolation points FIP are determined on the trajectory curve B1, correction interpolation points IP' must be calculated for every interpolation point IP and fine interpolation point FIP. In the second case, the correction interpolation points IP' are initially determined on the basis of the interpolation points IP, and the fine interpolation points FIP are placed each time between two correction interpolation points IP'. As already mentioned at the outset, which of the processes for changing feedrate is preferable can depend on the set-up of the numerical control or of the corresponding control program. The following exemplified embodiment generally describes modifying feedrate by producing fine interpolation points FIP between two interpolation points IP at a time.

The trajectory curve depicted in FIG. 2 is subdivided into three path segments BS1, BS2 and BS3, which are bounded by the interpolation points IP1 and IP2, IP2 and IP3, IP3 and IP4, respectively. For reasons of simplicity, the trajectory curve lies in the XY plane, however, it could just as easily be a three-dimensional trajectory curve. The coordinates of the interpolation points IP1 through IP4 are able to be specified in each case by (X, Y) coordinate pairs.

Normally, that is without an override selection, the tool of a numerically controlled machine is guided linearly from one interpolation point IP1 through IP4 to the next interpolation point, in each case, IP1 through IP4.

The "tool" is understood to mean any device used in the case of numerically controlled machines to traverse a trajectory curve or to execute a point-to-point movement. In the case of a machine tool or a robot, for example, this can be a milling, grinding, or boring tool, which is situated on a tool carriage or on the robot's hand and which contacts the workpiece to be machined. However, it can also be a device that scans or measures, etc., a contour—even without making contact—or which can be applied for any other purpose.

Assuming that the section from the interpolation point IP1, thus from the coordinates (X1,Y8), to the interpolation point IP2, thus to the coordinates (X5,Y8), amounts to 100 increments (whereby an increment corresponds to a specific distance), then this section would be traversed in the system clock cycle of, for example, one second. Therefore, the tool feedrate amounts to 100 increments per second.

Assuming that the feedrate at which the trajectory curve is supposed to be traversed is to be reduced in half, then the value N=2 can be specified as a control parameter, which corresponds to an override of 50%.

On the basis of the setpoint selection of the override value, fine interpolation points $FIP1_2$, $FIP2_2$, $FIP3_2$ are calculated by the numerical control (the index specifies the value of the specific control parameter). These fine interpolation points are each situated in the middle between two interpolation points IP1 through IP4 on the path segments BS1, BS2, BS3 and are indicated in FIG.

2 as white circles. The distance from one of the interpolation points IP1 through IP4 to a fine interpolation point $FIP1_2$ through $FIP3_2$ and vice versa now amounts to 50 increments in each case. Per system clock cycle, thus per second in the Example, 100 increments are no longer traversed at this point, but rather only 50 increments in each case, so that the tool path feedrate of the tool has been reduced exactly by half.

To reduce the tool path feedrate to a third, a control parameter of N=3 is specified, which corresponds to an override value of 33%. Consequently, fine interpolation points $FIP1_3$ through $FIP6_3$ are calculated by the numerical control. These fine interpolation points $FIP1_3$ through $FIP6_3$ are indicated in FIG. 2 as square boxes. The distance of the fine interpolation points $FIP1_3$ through $FIP6_3$ from their respective interpolation points IP1 through IP3 now amounts in each case to 33 or 66 increments. Since a remainder is obtained when 100 increments are divided by the control parameter N=3, the distances from the fine interpolation points $FIP2_3$, $FIP4_3$ and $FIP6_3$ to the interpolation points IP2, IP3 and IP4 amounts in each case to 34 increments, so that these sections can be travelled at a just slightly higher velocity.

Due to the fact that the previously calculated interpolation points IP1 through IP4 are approached in any case—even when fine interpolation values FIP are calculated after the selection of an override value—the fidelity of the process with respect to the path is 100% guaranteed.

What is claimed is:

1. A method for performing contour compensation for numerically controlled machines, comprising the steps of:
   a) guiding a tool along a trajectory curve located at a specified distance from a contour, whereby the trajectory curve is subdivided into a plurality of path segments, each path segment being defined by a start and end interpolation point, wherein each end interpolation point serves also as the start interpolation point of the next path segment;
   b) determining a plurality of start and end correction interpolation points by adding a correction vector to each start and end interpolation point when a change in a geometry of the tool necessitates an alteration of the specified distance of the trajectory curve from the contour;
   c) generating a corrected trajectory curve by means of the correction interpolation points; and
   d) guiding a replacement tool along said corrected trajectory curve.

2. The method according to claim 1, further comprising the steps of:
   a) generating a plurality of fine interpolation points for each path segment between each start and end correction interpolation points in accordance with a specifiable control parameter; and
   b) guiding the replacement tool along successive path segments of the corrected trajectory curve, wherein the replacement tool moves from the start correction interpolation point to each of the plurality of fine interpolation points and to the end correction interpolation point of each path segment.

3. The method according to claim 1, further comprising the steps of:
   a) generating a plurality of fine interpolation points between the start and end interpolation points in accordance with a specifiable control parameter;
   b) generating a correction start and end interpolation point for each start and end interpolation point; and
   c) generating a correction fine interpolation point for each fine interpolation point.

* * * * *